UNITED STATES PATENT OFFICE.

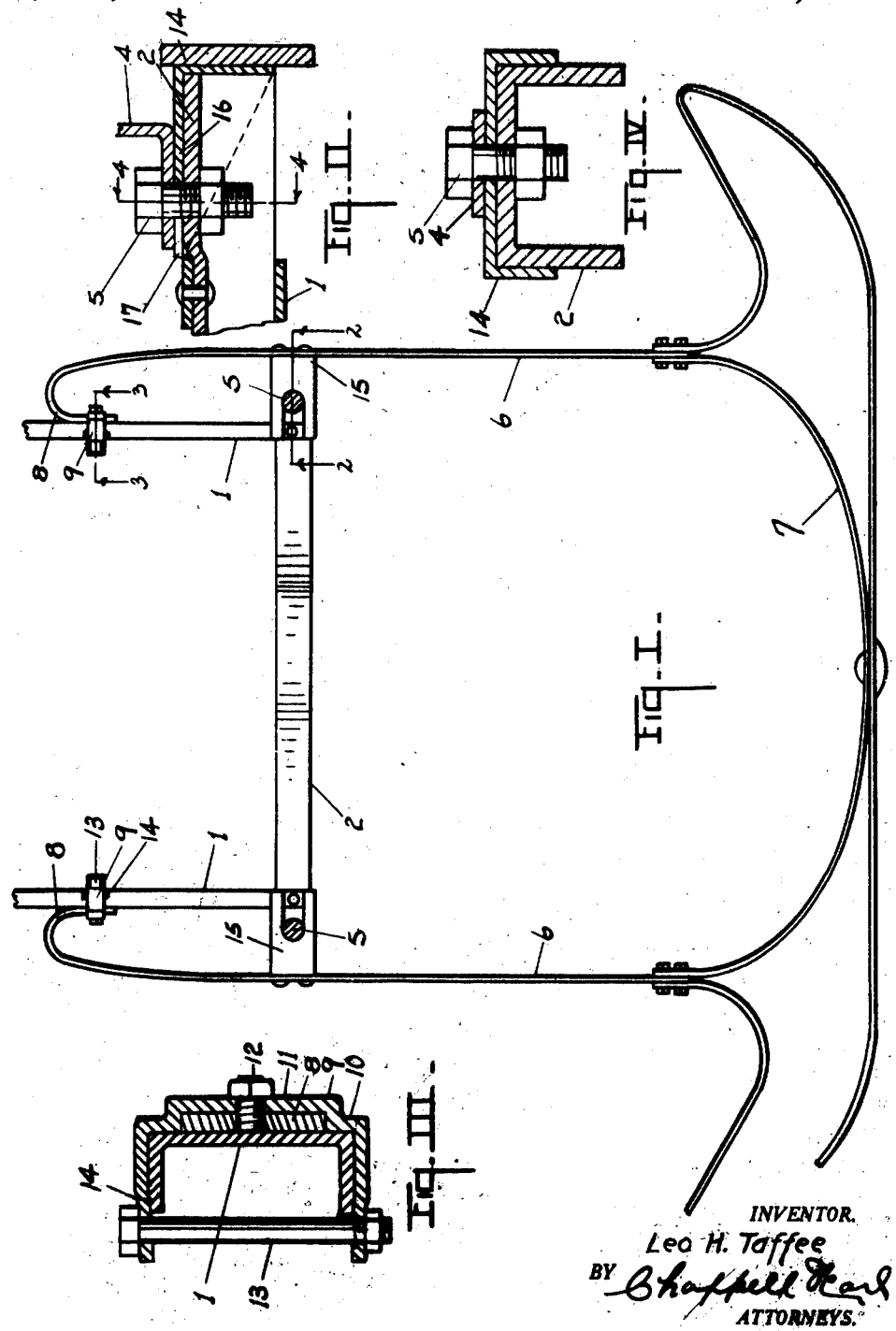

LEO H. TAFFEE, OF HASTINGS, MICHIGAN, ASSIGNOR TO HASTINGS MANUFACTURING COMPANY, OF HASTINGS, MICHIGAN.

AUTOMOBILE-BUMPER.

1,365,745.

Specification of Letters Patent.  Patented Jan. 18, 1921.

Application filed November 18, 1920. Serial No. 424,946.

*To all whom it may concern:*

Be it known that I, LEO H. TAFFEE, a citizen of the United States, residing at Hastings, in the county of Barry and State of Michigan, have invented certain new and useful Improvements in Automobile-Bumpers, of which the following is a specification.

This invention relates to improvements in automobile bumpers.

The main objects of this invention are:

First, to provide an improved rear bumper for automobiles which may be attached without the necessity of boring holes or otherwise changing the structure of the vehicle.

Second, to provide an improved automobile bumper having these advantages which may be quickly and easily mounted, and when mounted is very secure and capable of withstanding severe shocks and strains.

Further objects, and objects relating to structural details, will definitely appear from the detailed description to follow.

I accomplish the objects of my invention by the devices and means described in the following specification. The invention is clearly defined and pointed out in the claims.

A structure which is the preferred embodiment of my invention is clearly illustrated in the accompanying drawing forming a part of this specification, in which:

Figure I is a detail plan view of a bumper embodying the features of my invention, only such parts of automobile frame being illustrated as are necessary to show the application of my improvements, and these parts being shown in conventional form.

Fig. II is an enlarged detail section on a line corresponding to line 2—2 of Fig. I showing details of bumper mounting.

Fig. III is a detail section on a line corresponding to line 3—3 of Fig. I showing further details of the bumper mounting.

Fig. IV is a detail vertical section on a line corresponding to line 4—4 of Fig. II showing further structural details.

In the drawing similar reference characters refer to similar parts throughout the several views, and the sectional views are taken looking in the direction of the little arrows at the ends of the section lines.

Referring to the drawing 1 represents the side or longitudinal sills of an automobile and 2 the rear cross piece thereof. This cross piece is disposed with its ends projecting beyond the side sills as is the usual practice in automobile frames such as those of the "Ford," my improvements being illustrated as I have embodied them for use on "Ford" automobiles.

The body attaching brackets 4 are mounted upon the ends of the cross piece 2 by means of the bolts 5. A pair of supporting arms 6 are provided for the bumper 7. These arms 6 have their forward ends bent inwardly and rearwardly at 8, the inturned ends being secured to the longitudinal sills 1 by means of the clips 9. The cross portions 10 of these clips have offsets 11 therein in which the ends of the arms are secured by the bolts 12. The clips embrace the sills 1 and are clamped thereon by bolts 13 disposed through the arms of the clips on the inner sides of the sills, the arms being drawn inwardly and clamped upon the sills, and it is found that the arms of the sills will spring or indent somewhat as indicated at 14 so that the clamps are supported against longitudinal movement.

The arms are further supported by the channel-shaped brackets 15 which are secured on the inner sides of the arms and embrace the ends of the cross piece 2. The top portions 16 of these brackets are clamped between the body attaching brackets 4 of these cross pieces, the top portions being longitudinally slotted at 17 to receive the bolts 5.

With the parts thus arranged the bumper is supported so that it is capable of withstanding the severe shocks and strains to which it might be subjected in use. Further, it may be quickly attached without in any way modifying the vehicle.

Having thus described my invention, what I claim as new and desire to secure by Letters Patent is:

1. The combination with the frame of an automobile comprising a longitudinal sill and a cross piece disposed at the rear end of said sill with its end projecting beyond the same and a body attaching bracket mount d on the end of said cross piece, of a rear bumper, a supporting arm therefor having its front end bent inwardly and rearwardly, a U-shaped clip embracing said sill and having an offset in the cross portion thereof in which the inturned end of said arm is secured, a clamping bolt disposed through the arms of said clip on the inner side of said sill, and a channeled bracket on the inner side of said arm embracing the end of said cross piece, the top portion of said bracket being clamped between said cross piece and body attaching bracket and being longitudinally slotted to receive an attaching bolt for said body bracket.

2. The combination with the frame of an automobile comprising a longitudinal sill and a cross piece disposed at the rear end of said sill and a body attaching bracket mounted on said cross piece, of a rear bumper, a supporting arm therefor, a U-shaped clip embracing said sill and to which said arm is secured, a clamping bolt disposed through the arms of said clip on the inner side of said sill, and a channeled bracket on said arm embracing the end of said cross piece, the top portion of said bracket being clamped between said cross piece and body attaching bracket and being longitudinally slotted to receive an attaching bolt for said body bracket.

3. The combination with the frame of an automobile comprising a longitudinal sill and a cross piece disposed at the rear end of said sill and a body attaching bracket mounted on the end of said cross piece, of a rear bumper, a supporting arm therefor having its front end bent inwardly and forwardly, a U-shaped attaching clip for the front inturned end of said arm embracing said sill, a clamping bolt disposed through the arms of said clip on the inner side of said sill, and a bracket on said arm clamped between said cross piece and body attaching bracket.

4. The combination with the frame of an automobile comprising a longitudinal sill and a cross piece disposed at the rear end of said sill and a body attaching bracket mounted on the end of said cross piece, of a rear bumper, a supporting arm therefor, a U-shaped attaching clip for the front end of said arm embracing said sill, a clamping bolt disposed through the arms of said clip on the inner side of said sill, and a bracket on said arm clamped between said cross piece and body attaching bracket.

5. The combination with the frame of an automobile comprising a longitudinal sill and a cross piece disposed at the rear end of said sill and a body attaching bracket mounted on said cross piece, of a bumper, a supporting arm therefor having its front end secured to said sill, and a channeled bracket on said arm embracing the end of said cross piece, the top portion of said bracket being clamped between said cross piece and the body attaching bracket and being longitudinally slotted to receive an attaching bolt for said body bracket.

6. The combination with the frame of an automobile comprising a longitudinal sill and a cross piece disposed at the rear end of said sill and a body attaching bracket mounted on said cross piece, of a bumper, a supporting arm therefor having its front end secured to said sill, and a bracket on said arm clamped between said cross piece and body attaching bracket.

7. The combination with the frame of an automobile comprising longitudinal sills and a cross piece disposed at the rear ends of said sills with its ends projecting beyond the same and body attaching brackets bolted upon the ends of said cross piece, of a rear bumper, supporting arms therefor having their front ends bent inwardly and rearwardly and secured to said sills, and channeled brackets on the inner sides of said arms embracing the ends of said cross piece, the top portions of said brackets being clamped between said cross piece and said body attaching brackets and being longitudinally slotted to receive the body bracket attaching bolts.

8. The combination with the frame of an automobile comprising longitudinal sills and a cross piece disposed at the rear ends of said sills and body attaching brackets mounted on said cross piece, of a rear bumper, supporting arms therefor having their front ends secured to said sills, and supporting brackets on said arms clamped between said cross piece and said body attaching brackets.

In witness whereof, I have hereunto set my hand and seal in the presence of two witnesses.

LEO H. TAFFEE. [L. S.]

Witnesses:
OBEN E. JOHNSON,
MARGARET MCCALL.